(12) United States Patent
Aguera y Arcas et al.

(10) Patent No.: US 9,679,071 B2
(45) Date of Patent: *Jun. 13, 2017

(54) PERSISTENT CONTEXTUAL SEARCHES

(71) Applicant: Microsoft Corporation, Redmond, WA (US)

(72) Inventors: Blaise H. Aguera y Arcas, Seattle, WA (US); Stephen Lawler, Kirkland, WA (US); Scott V. Fynn, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/677,286

(22) Filed: Nov. 14, 2012

(65) Prior Publication Data

US 2013/0151513 A1 Jun. 13, 2013

Related U.S. Application Data

(63) Continuation of application No. 13/316,554, filed on Dec. 11, 2011, now Pat. No. 8,326,831.

(51) Int. Cl.
   *G06F 17/30* (2006.01)
(52) U.S. Cl.
   CPC ................ *G06F 17/3087* (2013.01)
(58) Field of Classification Search
   CPC ................ G06F 17/30; G06F 17/00
   See application file for complete search history.

(56) References Cited

U.S. PATENT DOCUMENTS

| | | |
|---|---|---|
| 3,623,018 A | 11/1971 | Evans et al. |
| 3,681,762 A | 8/1972 | Minshull et al. |
| 3,906,455 A | 9/1975 | Houston et al. |
| 3,913,074 A | 10/1975 | Homberg et al. |
| 4,677,550 A | 6/1987 | Ferguson |

(Continued)

FOREIGN PATENT DOCUMENTS

| | | |
|---|---|---|
| EP | 889421 A1 | 1/1999 |
| EP | 1619597 A1 | 1/2006 |

(Continued)

OTHER PUBLICATIONS

Millard, Ian, David De Roure, and Nigel Shadbolt. "The use of ontologies in contextually aware environments." (2004): 42-47.*

(Continued)

*Primary Examiner* — Farhan Syed
(74) *Attorney, Agent, or Firm* — Jeffrey L. Ranck; Ranck IP Law

(57) ABSTRACT

A badge may be assigned to a person, where the badge represents a characteristic or recurrent behavior of the person. A query may be associated with a badge, and the query may be continually used in a search request in combination with the person's context, thereby allowing the person to be continually provided with fresh results that may be relevant to the person's durable characteristics and current context. In one example, the person carries a handheld device, and the results are presented to the user on the user's desktop or lock screen. The act of providing the results may be triggered in various ways, such as movement of the person who carries the device, or the availability of sufficiently high-quality results.

20 Claims, 6 Drawing Sheets

(56) References Cited

U.S. PATENT DOCUMENTS

| | | |
|---|---|---|
| 5,191,610 A | 3/1993 | Hill et al. |
| 5,192,500 A | 3/1993 | Treddenick |
| 5,201,047 A | 4/1993 | Maki et al. |
| 5,379,928 A | 1/1995 | Mikkelsen |
| 5,539,665 A | 7/1996 | Lamming et al. |
| 5,606,691 A | 2/1997 | Watts et al. |
| 5,644,657 A | 7/1997 | Capps et al. |
| 5,762,292 A | 6/1998 | Schweyer et al. |
| 5,894,462 A | 4/1999 | Hwangbo |
| 5,940,825 A | 8/1999 | Castelli et al. |
| 5,978,733 A | 11/1999 | Deshimaru et al. |
| 5,982,370 A | 11/1999 | Kamper |
| 6,052,439 A | 4/2000 | Gerszberg et al. |
| 6,340,116 B1 | 1/2002 | Cecil et al. |
| 6,587,895 B1* | 7/2003 | Golovchinsky ...... G06Q 10/109 710/12 |
| 6,837,423 B2 | 1/2005 | Needham |
| 7,016,855 B2* | 3/2006 | Eaton ................ G06Q 10/10 340/988 |
| 7,136,512 B2 | 11/2006 | Burns |
| 7,523,096 B2 | 4/2009 | Badros et al. |
| 7,818,659 B2 | 10/2010 | Kahn et al. |
| 7,840,527 B2 | 11/2010 | Kahn et al. |
| 7,865,511 B2 | 1/2011 | Kahn et al. |
| 7,900,131 B2 | 3/2011 | Kahn et al. |
| 7,942,321 B2 | 5/2011 | Linton et al. |
| 8,001,055 B2 | 8/2011 | Weiss |
| 8,060,830 B2 | 11/2011 | Kahn et al. |
| 8,078,497 B1 | 12/2011 | Ling et al. |
| 2002/0103813 A1 | 8/2002 | Frigon |
| 2003/0089766 A1 | 5/2003 | Needham |
| 2003/0151761 A1 | 8/2003 | Burns |
| 2005/0071251 A1 | 3/2005 | Linden et al. |
| 2005/0289147 A1 | 12/2005 | Kahn et al. |
| 2005/0289468 A1 | 12/2005 | Kahn et al. |
| 2006/0026013 A1 | 2/2006 | Kraft |
| 2006/0074883 A1 | 4/2006 | Teevan et al. |
| 2006/0161845 A1 | 7/2006 | Kahn et al. |
| 2006/0200443 A1 | 9/2006 | Kahn et al. |
| 2006/0200740 A1 | 9/2006 | Kahn et al. |
| 2006/0253459 A1 | 11/2006 | Kahn et al. |
| 2006/0253489 A1 | 11/2006 | Kahn et al. |
| 2007/0033218 A1 | 2/2007 | Taylor |
| 2007/0220174 A1* | 9/2007 | Abhyanker ............ G06Q 90/00 709/250 |
| 2008/0086458 A1* | 4/2008 | Robinson ................ A63F 13/12 |
| 2009/0164929 A1 | 6/2009 | Chen et al. |
| 2009/0171968 A1* | 7/2009 | Kane ................ G06F 17/30867 |
| 2009/0234814 A1* | 9/2009 | Boerries ........... G06F 17/30864 |
| 2009/0307306 A1 | 12/2009 | Jalon et al. |
| 2009/0307615 A1 | 12/2009 | Jalon et al. |
| 2009/0307622 A1 | 12/2009 | Jalon et al. |
| 2009/0307626 A1 | 12/2009 | Jalon et al. |
| 2010/0245361 A1* | 9/2010 | Ofek .................. G06Q 30/0241 345/441 |
| 2010/0251169 A1* | 9/2010 | Kimchi ............ G06F 17/30861 715/808 |
| 2010/0318535 A1 | 12/2010 | Weber et al. |
| 2010/0318551 A1 | 12/2010 | Lai |
| 2011/0040753 A1 | 2/2011 | Knight |
| 2011/0088003 A1* | 4/2011 | Swink .................... H04L 51/32 715/863 |
| 2011/0231223 A1* | 9/2011 | Winters ................ G06Q 20/10 705/7.29 |
| 2011/0302203 A1 | 12/2011 | Tracy et al. |
| 2012/0022945 A1* | 1/2012 | Falkenborg ......... G06Q 30/0255 705/14.53 |
| 2012/0036220 A1* | 2/2012 | Dare ........................ G06F 8/61 709/217 |
| 2012/0036245 A1* | 2/2012 | Dare ........................ G06F 8/60 709/223 |
| 2012/0036440 A1* | 2/2012 | Dare ..................... G06F 9/4445 715/734 |
| 2012/0036442 A1* | 2/2012 | Dare ........................ G06F 8/60 715/736 |
| 2012/0036552 A1* | 2/2012 | Dare ................... H04L 41/0253 726/1 |
| 2012/0059702 A1* | 3/2012 | Yoder ..................... G06Q 30/02 705/14.17 |
| 2012/0066062 A1* | 3/2012 | Yoder ................ G06Q 30/0253 705/14.51 |
| 2012/0066064 A1* | 3/2012 | Yoder ..................... G06Q 30/00 705/14.53 |
| 2012/0069131 A1* | 3/2012 | Abelow ............... G06Q 10/067 348/14.01 |
| 2012/0084247 A1 | 4/2012 | Aguera y Arcas et al. |
| 2012/0190386 A1* | 7/2012 | Anderson ............. G01C 15/04 455/456.3 |
| 2012/0271691 A1* | 10/2012 | Hammad ............... G06Q 30/02 705/14.17 |
| 2012/0310831 A1* | 12/2012 | Harris ................... G06Q 30/02 705/44 |
| 2012/0323898 A1* | 12/2012 | Kumar ............. G06F 17/30867 707/723 |
| 2013/0073366 A1* | 3/2013 | Heath ................ G06Q 30/0261 705/14.25 |
| 2013/0073376 A1* | 3/2013 | Heath ..................... G06Q 30/02 705/14.39 |
| 2013/0073377 A1* | 3/2013 | Heath ..................... G06Q 30/02 705/14.39 |
| 2013/0073387 A1* | 3/2013 | Heath ..................... G06Q 50/01 705/14.53 |
| 2013/0073388 A1* | 3/2013 | Heath ..................... G06Q 50/01 705/14.53 |
| 2013/0073389 A1* | 3/2013 | Heath ..................... G06Q 50/01 705/14.54 |
| 2013/0073400 A1* | 3/2013 | Heath ..................... G06Q 30/02 705/14.73 |
| 2013/0073464 A1* | 3/2013 | Magpayo ........... G06Q 30/0256 705/44 |
| 2013/0073473 A1* | 3/2013 | Heath ..................... G06Q 30/02 705/319 |
| 2013/0073859 A1* | 3/2013 | Carlson ................. H04L 9/3247 713/176 |
| 2013/0117108 A1* | 5/2013 | Spears ............... G06Q 30/0255 705/14.53 |
| 2013/0124263 A1* | 5/2013 | Amaro ................... G06Q 30/02 705/7.34 |
| 2014/0006129 A1* | 1/2014 | Heath ................. G06Q 30/0222 705/14.23 |
| 2014/0244353 A1* | 8/2014 | Winters ................ G06Q 20/10 705/7.29 |
| 2015/0039462 A1* | 2/2015 | Shastry ............. G06Q 30/0633 705/26.7 |

FOREIGN PATENT DOCUMENTS

| | | |
|---|---|---|
| JP | 2009271845 A | 11/2009 |
| WO | 2009/086014 A1 | 7/2009 |

OTHER PUBLICATIONS

Schmidt, Albrecht, Michael Beigl, and Hans-W. Gellersen. "There is more to context than location." Computers & Graphics 23, No. 6 (1999): 893-901.*

Bellotti V, Begole B, Chi EH, Ducheneaut N, Fang J, Isaacs E, King T, Newman MW, Partridge K, Price B, Rasmussen P. Activity-based serendipitous recommendations with the Magitti mobile leisure guide. InProceedings of the SIGCHI Conference on Human Factors in Computing Systems Apr. 6, 2008 (pp. 1157-1166). ACM. (10 total pages).*

Böhmer, Matthias, Gernot Bauer, and Antonio Krüger. "Exploring the design space of context-aware recommender systems that suggest mobile applications." In 2nd Workshop on Context-Aware Recommender Systems. 2010. (5 total pages).*

Lamming, Michael G., and William M. Newman. "Activity-based information retrieval technology in support of personal memory." In IFIP Congress (3), vol. 14, pp. 68-81. 1992. (13 total pages).*

(56) References Cited

OTHER PUBLICATIONS

"International Search Report and Written Opinion of the International Searching Authority", Mail Date: Mar. 29, 2013, Application No. PCT/US2012/060424, Filed date: Oct. 16, 2012, 10 pages.
Chard, Ian, "Share, Collaborate, Exploit ~ Defining Mobile Web 2.0", Retrieved at <<http://www.cs.ucl.ac.uk/staff/d.quercia/others/mobile2.pdf>>, Whitepaper, May 2008, 10 pages (cover page, plus pp. 1-9).
Shen et al., "Implicit User Modeling for Personalized Search", Retrieved at <<http://sifaka.cs.uiuc.edu/czhai/pub/cikm05-ucair.pdf>>, Proceedings of the 14th ACM international conference on Information and knowledge management (CIKM'05), Oct. 31-Nov. 5, 2005, 8 pages.
"Office Action & Search Report Received for Chinese Patent Application No. 201210385675. 3", Mailed Date: Sep. 2, 2014, 12 Pages.
"Supplementary Search Report Issued in European Patent Application No. 12857339.1", Mailed Date: Jun. 25, 2015, 8 Pages.
"Third Office Action Issued in Chinese Patent Application No. 201210385675.3", Mailed Date: Oct. 8, 2015, 6 Pages.
Lee, et al., "Context-Aware Recommendations on the Mobile Web", In Workshops on the Move to Meaningful Internet Systems, vol. 3762, Jan. 1, 2005, pp. 142-151.
"Office Action Issued in Japanese patent Application No. 2014-547226", Mailed Date: Jul. 28, 2016, 7 pages.
"Second Office Action Issued in Chinese Patent Application No. 201210385675.3", Mailed Date: Apr. 3, 2015, 8 Pages.
"Office Action by the European Patent Office". No. M11899WOEP dated Jan. 3, 2017. One Page for EP patent application #12,857,339.1.

* cited by examiner

PERSISTENT CONTEXTUAL SEARCHES

CROSS-REFERENCE TO RELATED CASES

This is a continuation of U.S. patent application Ser. No. 13/316,554, entitled "Persistent Contextual Searches," filed on Dec. 11, 2011.

BACKGROUND

Many searches are based on context. A person who searches for "restaurant" might want to know about restaurants generally, but more likely the person is looking for a nearby restaurant. In this example, the context associated with the search is the location in which the search is being performed. While a person can perform any type of contextual search, people tend to search recurrently for the same things, in predictable patterns. For example, a person who likes Chinese restaurants is likely to search for Chinese restaurants frequently. If the person is registered with an online service and has given appropriate permission for his searches and other behaviors to be mined, then the service might deduce the person's affinity for Chinese restaurants and might assign a virtual "Chinese restaurant" badge to that person as a way of designating the person's affinity.

A badge (or another type of expression of a person's affinities and interests) can be used in various ways—e.g., as a method of promoting social cohesion among like-minded people in an online setting. However, there are other ways in which a badge can be used.

SUMMARY

A badge can be used as a basis to perform a persistent search that is based on the user's location or other context. The user can be shown results that change as the user's context changes. Moreover, the results can be shown to the user without the user's having to request the search explicitly, since the search request may be inferred from the fact that the badge has been assigned to the user.

Initially, the user earns a badge. For example, a user who frequently eats at tapas restaurants or bars might earn a "tapas" badge, thereby designating the user as someone who is interested in tapas. Similarly, badges such as "golf enthusiast", "wine lover", "Ivy League alum", "world traveler", could be assigned based on the user's behavior, or based on a user's express selection of a badge. (To the extent that badge assignments would be deduced from the user's behavior, appropriate permission to mine this behavior may be obtained from the user in order to preserve the user's interest in privacy.) A query may be associated with a badge. Contextual information (e.g., the user's location) may be added to the query, and the contextual information may be updated as the context changes. The query may be executed recurrently, and the results may be shown to the user in response to an appropriate trigger. The execution of the query, and the showing of the results to the user, may take place without any explicit or direct request by the user. In this way, results that update automatically, and continually, may be provided to the user as part of the experience that the user's device provides. Users may be able to edit the query associated with a badge, and may affect the search experience in various other ways.

Search results may be shown to a user in various ways—e.g., on the desktop, on the lock screen, etc. Moreover, search results may be shown in response to various triggers, such as when the user moves from one location to another, or when sufficiently high-quality results are available.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
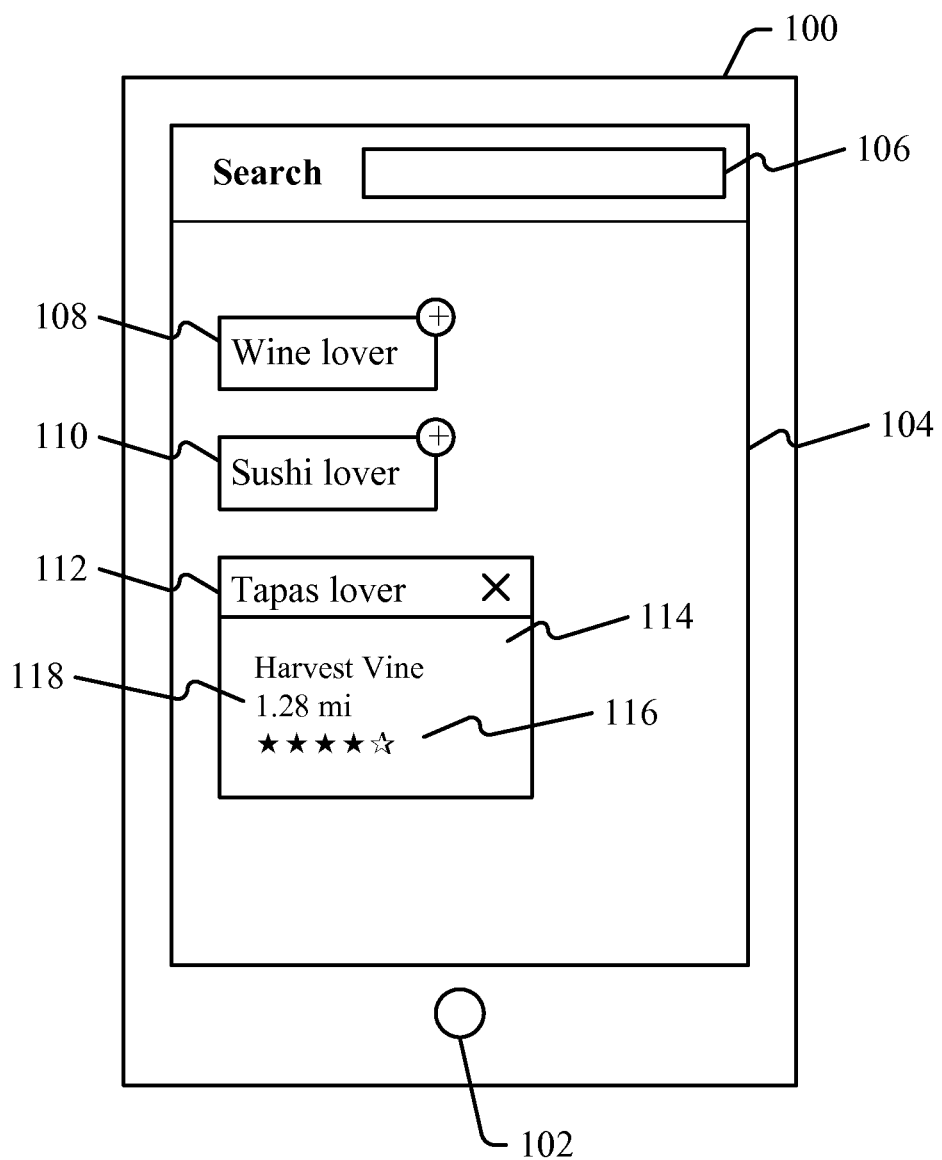
FIG. 1 is a block diagram of a first example of a badge-based search experience, as that experience might look on an example device.

As people make increasing use of mobile devices to access information, people often expect their mobile devices to anticipate the information that they want to see. The traditional method of search is for a person to invoke a search application (e.g., by visiting a search engine's web site) and to enter a search query explicitly. However, search has evolved to support scenarios other than an explicit search. In particular, a search can be viewed as a way of describing what information is sought, given that the underlying information, and the context in which the information is being requested, is constantly changing.

Local searches typify the scenario of changing information and changing context. For example, a user who is looking for a tapas restaurant might enter the query "tapas". However, the response to this query may depend on both the user's current circumstances (e.g., his or her location), and the current state of a business directory that lists existing businesses. The response depends on the user's current circumstances because, in one example, the query is interpreted as implicitly requesting tapas restaurants that the user can reasonably get to in the near future (e.g., restaurants that are near the user's current location). The response also depends on the current state of the directory because new restaurants open and old ones close, so the set of responses that are appropriate—given a particular location for the user—can change throughout time.

In theory, anyone can perform any search, contextual or otherwise. However, in reality, people often perform certain types of searches based on predictable patterns—e.g., based on their interests, their lifestyles, and other factors. For example, if a person is an established tapas enthusiast, he or she may want to search for tapas bars recurrently, so that he or she can see the location of the nearest tapas restaurant and reviews of those restaurants. If a person likes wine, or art museums, or laser tag, then he or she may frequently do searches related to those concepts. It is convenient, therefore, to think of such searches not so much as discrete events, but rather as requests to provide continually-updating information that can change as a user's location (or other context) changes.

Some systems implement the notion of a badge, which is a concept that can be associated with a user who has exhibited certain behaviors. A user who has frequently searched for, or eaten in, tapas restaurants may be assigned the "tapas" badge. A user who frequently plays laser tag may be assigned the "laser tag" badge. Such badges describe a durable property of a user, and may suggest a search that is to be performed. It is noted that the acts that causes the user to earn the badge are often behaviors that are unrelated to the act of requesting a search or entering a query. For example, the acts of riding the same bus to work each day, or playing golf five times per year, or visiting one's sister each Saturday at 2 pm, are behaviors that are not associated with searches. The act of engaging in such behaviors is not normally associated with the act of requesting a search, and engaging in these behaviors does not directly cause a search to be performed.

The subject matter described herein uses badges, or similar types of information about a user, to perform a search. The search may be continually updated, and may be based on the user's present physical location or other contextual information about the user. A triggering event may cause the result to be displayed on a device associated with the user, such as a smart phone or other mobile device. As the user changes context (e.g., by moving from one place to another), the result that is displayed may be updated. For example, the "tapas" badge may be associated with the query "tapas restaurant", with the implied geographic term "here." Thus, a user's having the tapas badge causes the query "tapas restaurant here" to be continually searched, and updated information based on this query may be shown. If the user is in Seattle, one set of results may be produced; if the user is in San Francisco, another set of results may be produced. While the user could explicitly execute this query in different places, because the user has been identified as a tapas enthusiast (via the assignment of the "tapas" badge to the user), software on the user's device may continually execute this query and may provide results to the user, without the user's explicitly or directly having to initiate the search process or indicate a change in location.

The result of a badge-driven search may be displayed to the user in various ways. In one example, the result may be displayed on the "lock" screen of the user's device, before the user has unlocked the device. In another example, the result may be displayed on the home screen of the device after the user unlocks the device.

The query to be associated with the badge may be customized by the user. For example, the user may edit the text query associated with a badge, or may specify various filters (e.g., the results may be filtered so that only tapas restaurants with a rating of four stars or higher are shown).

In one example, the query results that are shown to a person with a particular badge may be influenced by the opinions of others with the same badge. For example, people might be given the opportunity to indicate a particular restaurant or other entity (with the indication being "recommend", "like", or some similar sentiment). If many people with the tapas badge like or recommend a particular tapas restaurant, then a person with the tapas badge might receive results that are biased in favor of that restaurant (e.g., by listing that restaurant higher on the search results).

It is noted that the notion of automatically executing a query associated with a badge is not the same as using a badge, or some passive information, to influence a search result. For example, if a user has the "vintage clothing" badge and enters the query "clothing," the badge might be used to influence the results of the "clothing" query in favor of vintage clothing. However, doing so is not the same as (nor is it an obvious variant of) associating a query with the badge and automatically executing the query. In one case, the user query is influenced by factors associated with the badge. In the other case, the badge itself is the source of the query that is actually executed. Moreover, it is noted that executing a query associated with a badge that has been earned through a behavior is not the same as (nor is it an obvious variant of) executing a saved query. While a saved query may have the same durable quality that some badges have, a saved query is merely a query that the user entered. A badge, on the other hand, might be earned through some behavior other than explicitly specifying a search to be performed. (It is noted that a badge that was earned through behavior continues to be distinct from a saved search, even if the user explicitly modifies the query associated with the badge. This is so because the badge itself, in one example, has to be earned through behavior, even if the user can later change the query associated with the badge that was earned through behavior. In this non-limiting example, a user cannot use a badge to save a search unless the user has earned the badge.)

Figure 6:
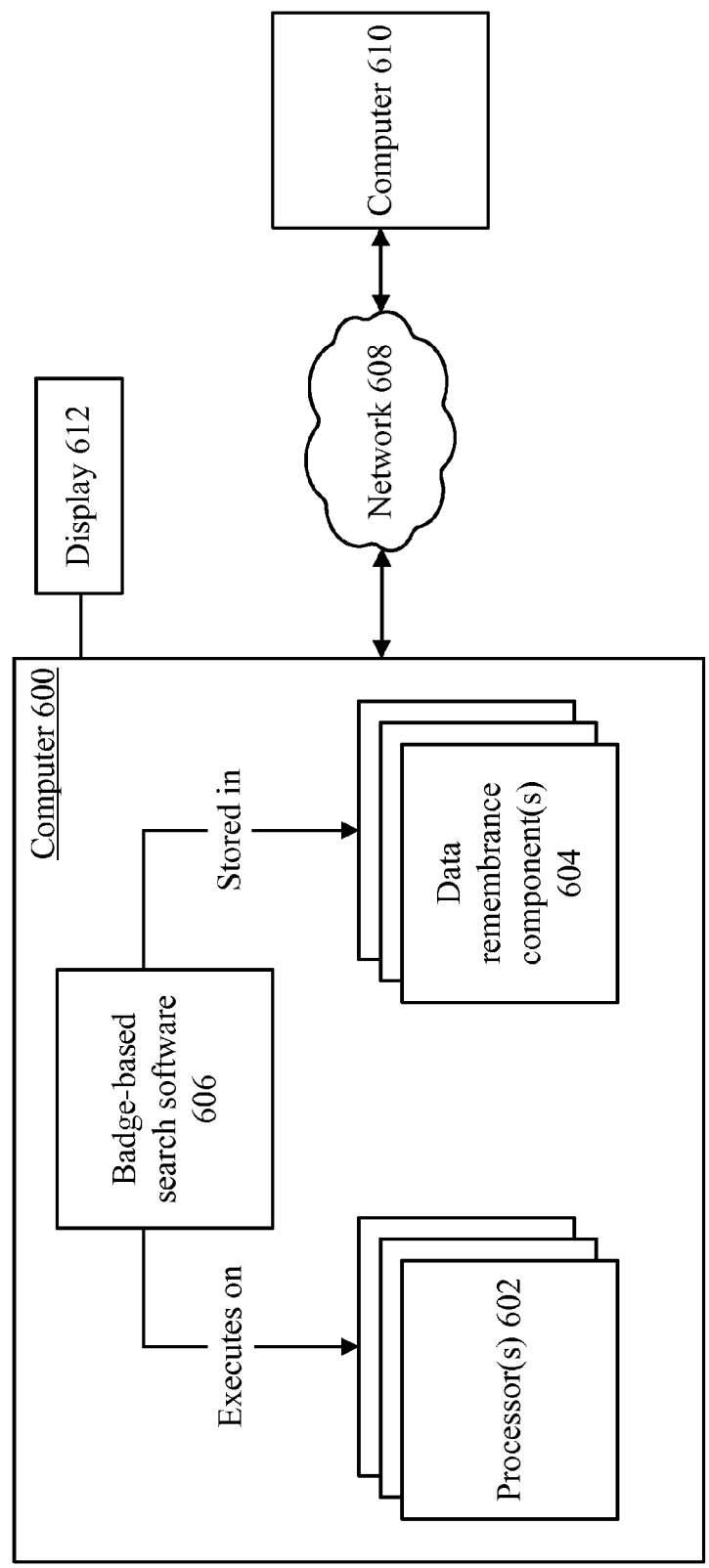
FIG. 6 is a block diagram of example components that may be used in connection with implementations of the subject matter described herein.

Turning now to the drawings, FIG. 1 shows an example badge-based search experience, as that experience might look on an example device. Device 100 may be a mobile telephone, a portable music player, a tablet computer, or any other type of device. Device 100 typically has some memory and some processing capability which are implemented, for example, using components that are shown in FIG. 6 and described below. Device 100 may have various controls, such as escape button 102 (which may have various functions, such as exiting an application and/or returning the view on device 100 to the home screen), and touch screen 104 (which serves as both an input device and an output/display device). In the experience shown in FIG. 1, various pieces of information may be displayed on touch screen 104. One such piece of information is search box 106, which allows a user to enter a query.

The experience may also show various badges 108, 110, and 112 that are associated with the user of device 100. In one example, the device knows which badges to display because the user is logged in to some online service, and the badges are associated with the user's account. In another example, the device is registered to a particular user, and the badges for the registered user are displayed. One of the example badges (badge 112) is shown larger than the others, thereby allowing the badge to indicate a search result. The reason for which badge 112 shows a search result might be that the user has clicked or tapped (or otherwise activated) the badge, thereby indicating that the user wants to see a current search result from the query associated with that badge. In another example, a passive trigger has caused the badge to display search results to the user. (Some example triggers are discussed below in connection with FIG. 5.) In the example shown, the search results 114 in the badge contain the name of a tapas restaurant. Since badge 112 is the "tapas lover" badge, the query associated with the badge might be "tapas" or "tapas restaurant", together with a geographic term that corresponds to the current location of the device. (Such a current location might be determined from GPS component on the device; location information from such a GPS might be used pursuant to appropriate permission obtained from the device's user.) Thus, the restaurant shown in search results 114 may be the name of a nearby tapas restaurant. It is noted that, in the example of FIG. 1, search results 114 show not only the name of the restaurant, but also a rating 116 for the restaurant, and information 118 indicating how far away the restaurant is. The rating and distance information are merely examples; any type of information about a search result could be shown.

Figure 2:
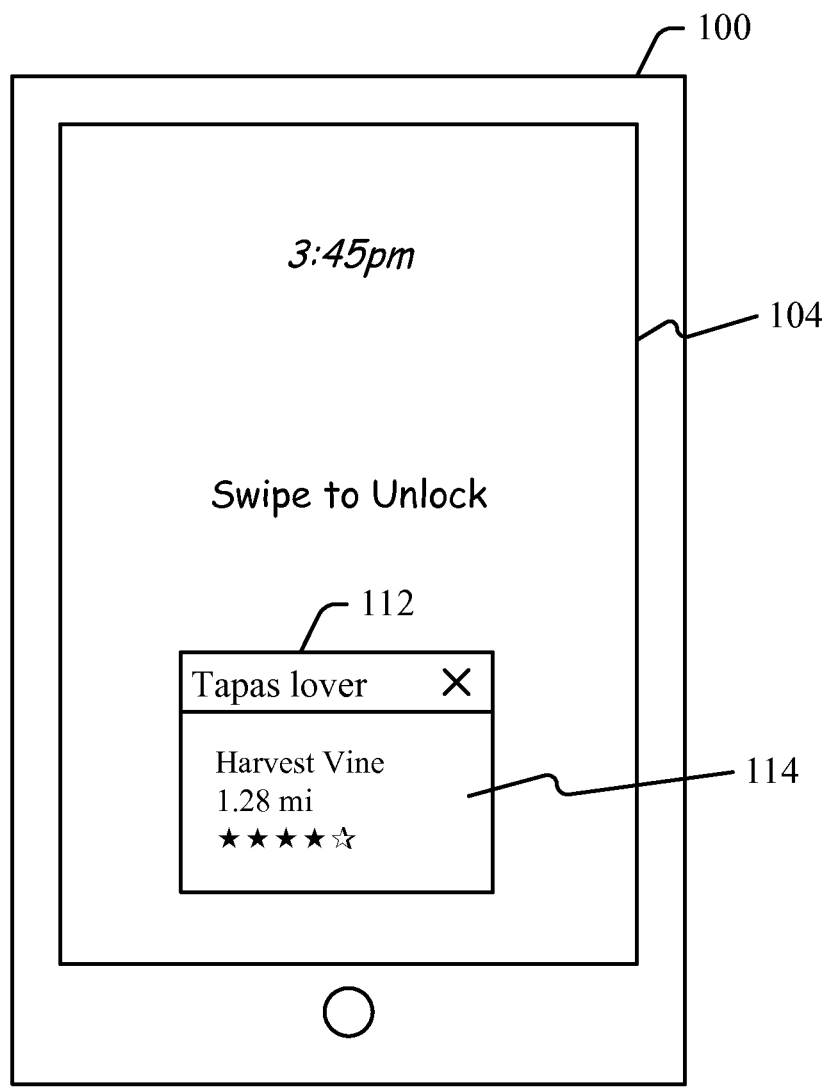
FIG. 2 is a block diagram of a second example of a badge-based search experience on the device of FIG. 1.

FIG. 2 shows another view of device 100, presenting a different type of badge-based search experience. In FIG. 2, device 100 is shown as having touch screen 104, discussed above in connection with FIG. 1. However, in FIG. 2, the information shown on touch screen 104 is the "lock" screen—i.e., the screen that prevents the user from performing unintended actions with the device while the user is not actively using the device. In general, lock screen allows the user to perform only a limited set of actions until the lock screen is unlocked—e.g., the lock screen might display the time and/or the network, might allow the user to "swipe to unlock", or might allow the user to answer an incoming phone call. However, in general active use of the device (e.g., using apps, performing explicit searches, etc.) involves the user's first unlocking the device.

In the example experience of FIG. 2, badge 112, and its associated search results 114, are shown on the lock screen. In this way, the user can see search results associated with his or her badges without having to unlock the device. FIG. 1, discussed above, is an example of showing badge-based search results after, or beneath, the lock screen; FIG. 2 is an example of showing badge-based search results on, or above, the lock screen.

Figure 3:
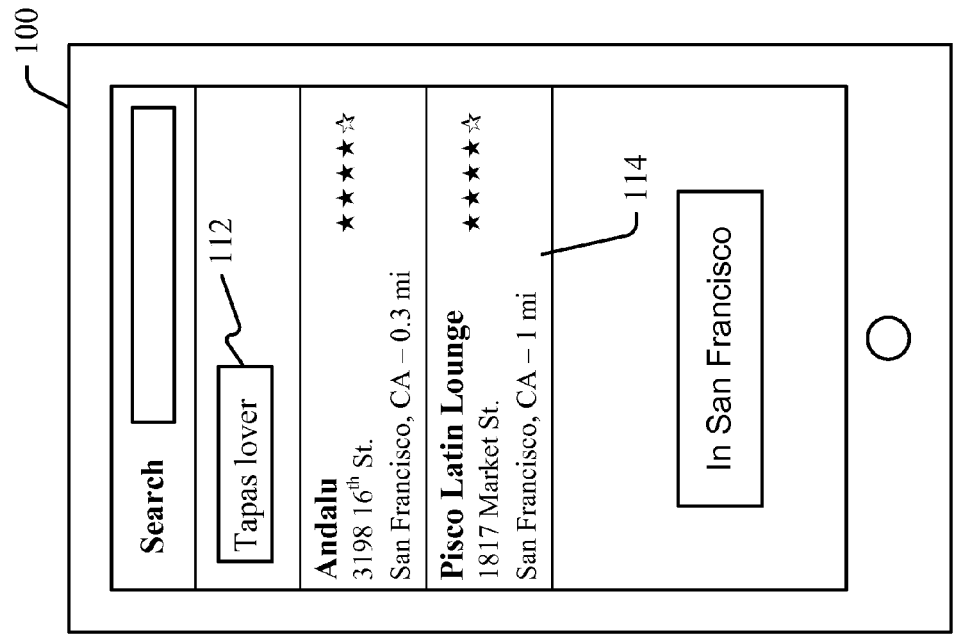
FIG. 3 is a block diagram of an example badge-based search experience that changes based on context.
Figure 3:
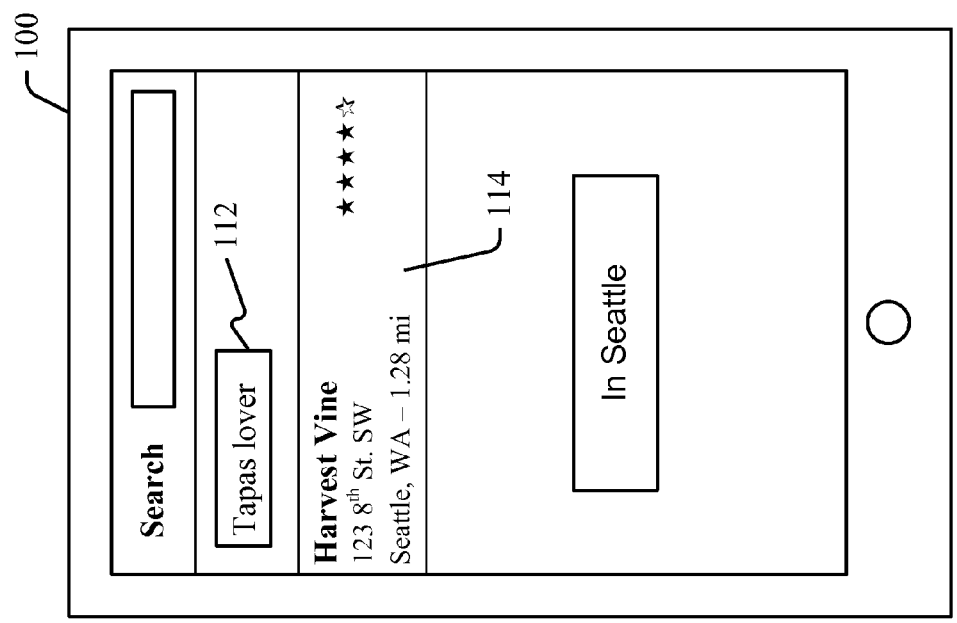

FIG. 3 shows an example badge-based search experience that changes based on context. FIG. 3 shows two views of device 100. As in FIG. 1, device 100 shows the beneath-the-lock-screen experience, including badge 112 associated with the user of the device. Moreover, the screen shows the search results associated with that badge. However, the two views of device 100 show how the experience changes based on the user's context. In this example, the context is composed of the user's physical location, although there could be other types of context that could influence a search—e.g., the time of day, the time of year, whether the user is at work or at home, etc.

Thus, in one view of device 100, the device (and the user carrying the device) are in Seattle. Therefore, search results 114 include a tapas restaurant in the Seattle area. In a second view of device 100, the device and its user are in San Francisco. Therefore, in the second view of device 100, the results include tapas restaurants that are located in San Francisco. As noted above, these searches may have been performed passively, based on the fact that the user has the "tapas lover" badge. Thus, the act of showing the user information that might be relevant to a "tapas lover" who is in the user's current location, without the user's having to make a direct request for the information, is part of the experience that is depicted in FIG. 3.

Figure 4:
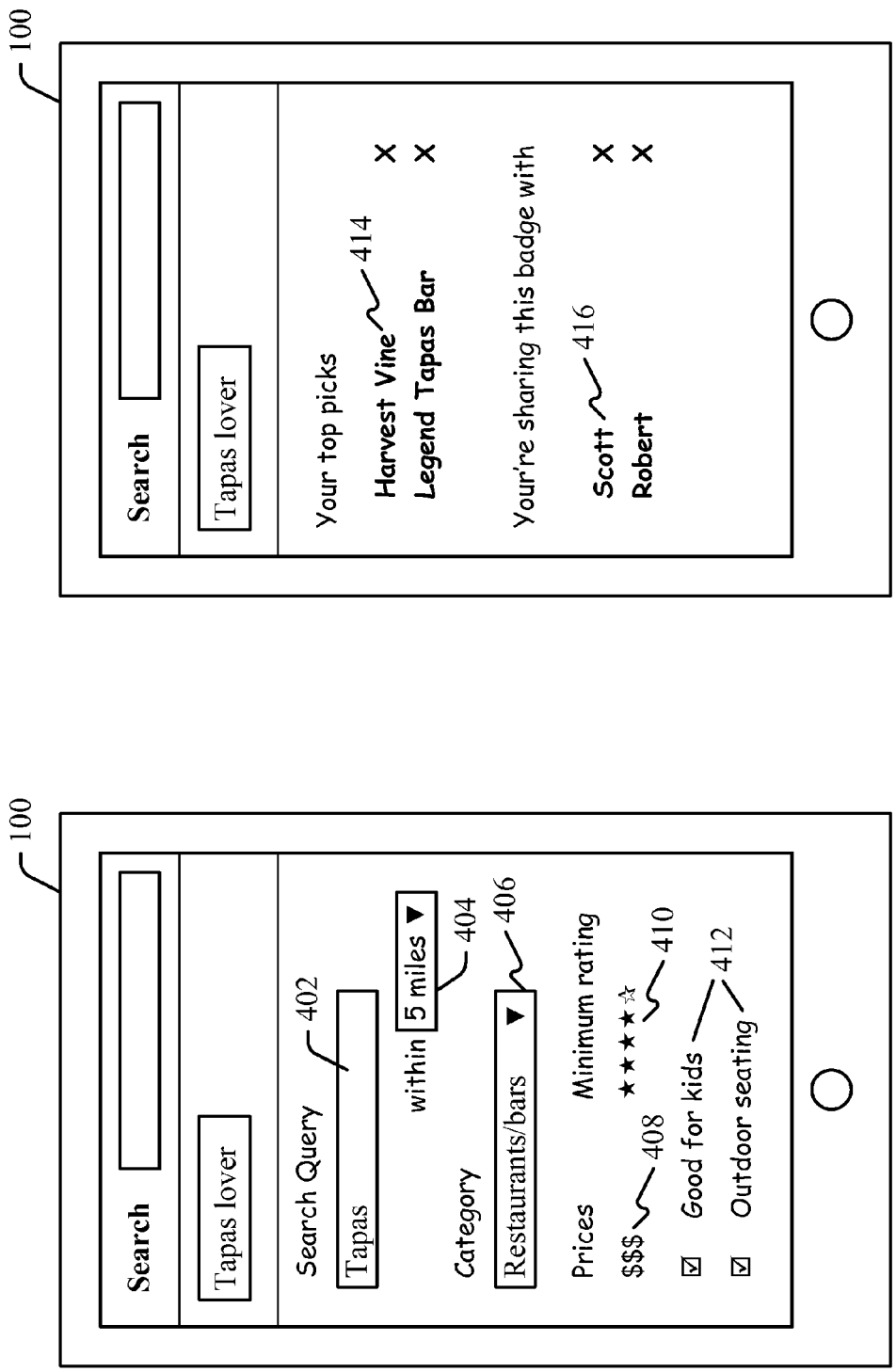
FIG. 4 is a block diagram of an interface that allows the search experience associated with a badge to be customized.

As noted above, the search experience associated with a badge may be customized by the user. FIG. 4 shows an example of how to customize the search associated with a badge.

The interface of FIG. 4 is shown in two separate screens on device 100; the user may be able to flip back and forth between the two screens. The interface comprises a box 402 that shows the text query associated with a badge. Additionally, the interface comprises various ways to narrow and/or filter the search performed on that text query. Thus the interface includes a menu 404 that allows the user to specify geographic limits on the search (e.g., within five miles of the present location); a category 406 of results to search for (e.g., "restaurants/bars"); constraints on the price and/or rating to be associated with a result (at 408 and 410); and other information 412 such as whether the entity listed in the search results is "good for kids" and/or has "outdoor seating." Thus, in the example shown, the search associated with a particular user's instance of the "tapas lover" badge uses the text query "tapas", the geographic constraint of being within "5 miles" (of the user's current location), the category constraint of "restaurants/bars", the price constraint of restaurants in the "three dollar sign" category, and the rating constraint that the restaurant be rated at least four stars. Additionally, the search imposes the criteria that the entity listed in the results be "good for kids" and have "outdoor seating." These parameters are configurable and customizable by the user. For example, a user could change the text in box 402 in order to change the underlying text query, or could change the geographic constraint, or could change any of the other aspects of the query.

In addition to allowing the user to customize the specific way in which the search is done, the customization interface may also allow the user to identify "top picks" 414, and other users 416 with whom the badge (or, rather, the user's customized version of the badge) is shared. Identifying the user's choices of "top picks" may allow the search results to be skewed or biased toward the items on the "top picks" list if those items are appropriate to the search query. For example, if the user has specified a five-mile geographic limit on the search and has specified the Harvest Vine restaurant as a top pick, then the search results may include Harvest Vine if the user happens to be within five miles of that restaurant. By specifying Harvest Vine as a top pick, Harvest Vine may be included in the search results even if the search algorithm otherwise would have omitted it, or Harvest Vine may appear at the top of the results even if the search algorithm otherwise would have placed it somewhere else in the results. Another consequence of specifying top picks is that the top picks of the various users who have the "tapas lover" badge may be collected, and these results may be used (anonymously) to influence the search results that other "tapas lovers" receive in their badge-based search experience. For example, if many holders of the "tapas lover" badge have indicated that Harvest Vine is a top pick, then the search results given to holders of that badge may be biased in favor of Harvest Vine—even for badge-holders who have not actually indicated Harvest Vine as a top pick. (It is noted that the user can add top picks, and also can delete top picks—as indicated by the deletion "X" shown in the interface.)

Another action that a user may perform on the customization interface is to specify users with whom the badge holder has decided to share the badge. A user may share a badge with other users, so that the other users also receive the search experience associated with that badge. The sharing of the badge may be controlled through the customization interface shown in FIG. 4. FIG. 4 shows two users with whom the badge has been shared; the badge can be shared with additional users by adding those users, or the badge can be "unshared" with users by deleting those users from the list (as indicated by the deletion "X" shown in the interface.)

Figure 5:
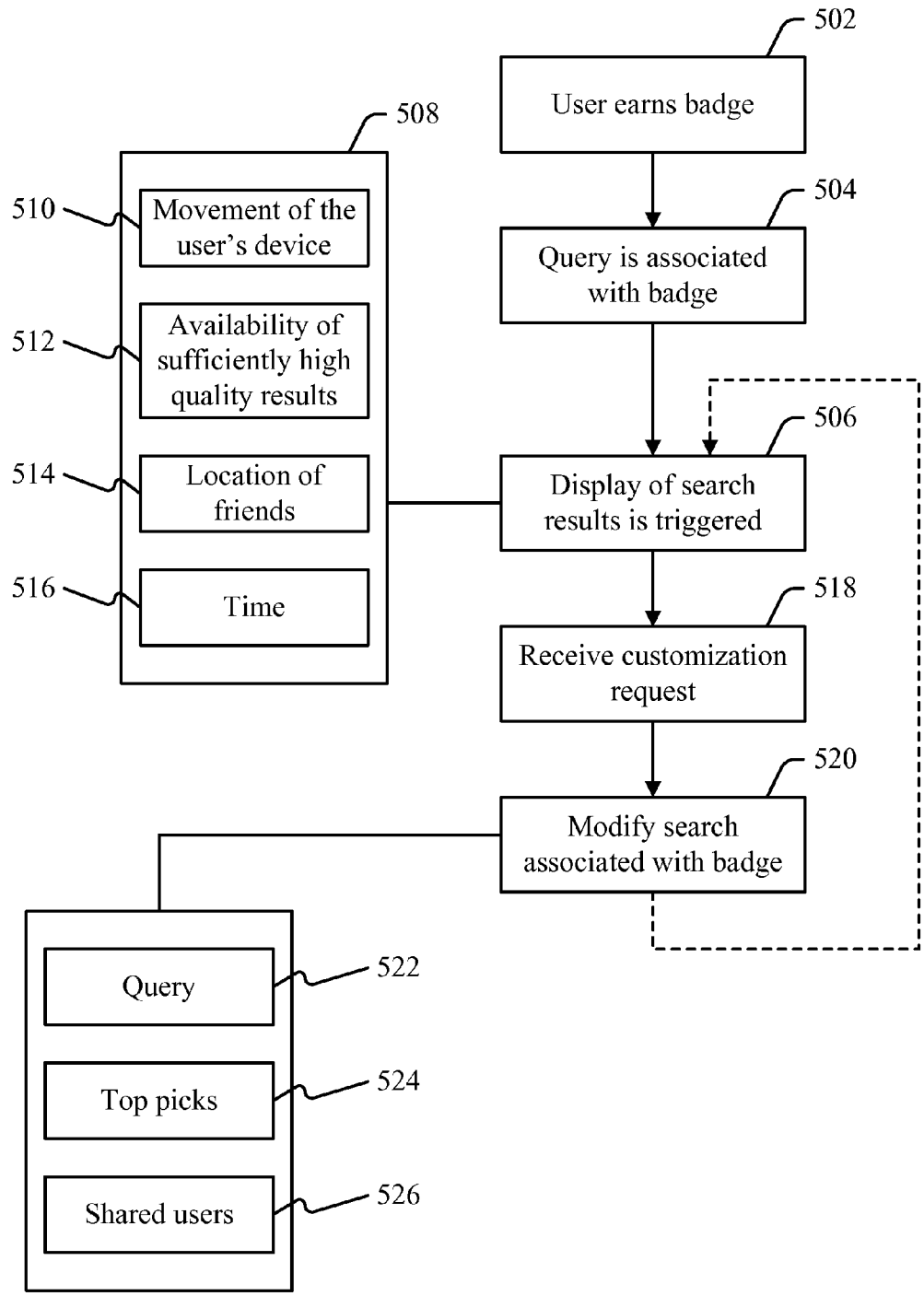
FIG. 5 is a flow diagram of an example process in which a badge-based search experience may be provided.

FIG. 5 shows an example process in which a badge-based search experience may be provided. Before turning to a description of FIG. 5, it is noted that the flow diagram in FIG. 5 is described, by way of example, with reference to components shown in FIGS. 1-4, although this process may be carried out in any system and is not limited to the scenarios shown in FIGS. 1-4. Additionally, the flow diagram in FIG. 5 shows an example in which stages of a process are carried out in a particular order, as indicated by the lines connecting the blocks, but the various stages shown in this diagram can be performed in any order, or in any combination or sub-combination.

At 502, a user earns a badge. The user may earn the badge by any appropriate process and/or set of actions. For example, a user might earn the "tapas lover" badge mentioned above by eating at some number of tapas restaurants. (This fact might be determined, for example, if the user's payment method is connected to the account that he or she uses on his or her phone. In this case, paying a bill at a tapas restaurant may be taken as an indication that the user has eaten at that restaurants, and eating at some number of restaurants within a given amount of time might earn the "tapas lover" badge. The user's payment information may be obtained pursuant to appropriate permission obtained from the user, in order to protect the user's expectation of privacy.) In another example, a user might earn a "wine enthusiast" badge by purchasing a certain amount of wine, or a "golf" badge by spending a certain amount of time on the golf course (as determined from the user's location, after the user gives appropriate permission to use his or her location) or by paying for a certain number of greens fees. Badges can be earned in any appropriate manner.

At 504, a query is associated with the badge. For example, the text query "tapas" may be associated with the "tapas lover" badge. Additionally, other information that is used to select search results—e.g., a geographic limitation, a limitation to "restaurants/bars", a particular rating, etc.—may be considered part of the query that is associated with the badge. Typically, the query that is associated with the badge is one that is assigned without user input. For example, the "tapas" query may be associated with the "tapas lover" badge automatically upon the user's earning the badge, without the user having to enter the query, or having to indicate in any way that the word "tapas" is the query that the user wants to associate with the badge. In one example, the user may later change the query associated with the badge, but the initial query typically is not one that the user has chosen, nor one as to which the user has any particular input or influence.

At 506, display of the search results is triggered. There are various ways in which the display of the search results might be triggered. In one example, current search results are continually displayed, in which case the trigger to display the results perpetually exists. In other example, triggers 508 might include movement of the user's device (at 510), availability of a sufficiently high quality result (at 512), location of friends (at 514), or the passage of time (at 516). The search results themselves may be obtained by issuing a search request, based on the query and also based on the context that exists at the device. The search request may be issued to a search provider, such as a server that runs search engine software.

In the case of movement (at 510), the fact that the user's device has moved from one city to another might be a trigger to display search results, since the results might change based on the user's location.

In the case of availability of a sufficiently high quality result (at 512), it might be the case that the quality of results changes as the user moves, and that some results are worth displaying and others are not. For example, if the user is in Seattle, there are likely to be highly relevant results to the query "tapas" within five miles. If the user starts driving south, there may be places where there are no results that satisfy the constraints of the query, or results that are not deemed of sufficient relevance to be worth displaying. Thus, the results associated with a badge might be displayed only when there are results that have scored sufficiently high in relevance; when only low-relevance results are available, the badge, and its associated results, might not be displayed at all.

In the case of the "location of friends" trigger (at 514), the display of results might be triggered by the fact that the user has friends who share the same badge and are nearby. In the example of the "tapas lover" badge, the user might be particularly interested in nearby tapas restaurants if he has friends nearby who would be willing to go to the restaurant with him. If such friends are in close proximity to each other, this fact might trigger the display of the "tapas lover" badge, and the associated search results, on the friends' respective devices. Thus, if users choose to share their locations, information about users being near each other could be used to determine when to display the results associated with a badge.

In the case of the passage of time (at 516), some systems might be configured to display the current results associated with a badge periodically at particular time intervals.

The foregoing are some examples of triggers, although other triggers could be used to determine when to display the search results associated with a badge.

After some amount of time, a customization request may be received (at 518). When such a customization request is received, the customization interface shown in FIG. 4 may be displayed, thereby allowing a user to affect the search criteria associated with a badge, as well as other information such as whom the badge is shared with and the user's "top picks" associated with the badge. The user may then enter customized information, and the search criteria (or other information) associated with a badge may be modified accordingly (at 520). Examples of the search criteria that that may be modified in response to a customization request include the query 522 (including both the text of the query, as well as any other criteria that are used to filter results, such as geographic constraints), the user's "top picks" 524, and the list of shared users 526.

After the search criteria are modified, the process may return to 506 to update the search results. It is noted that the act of "displaying" the search results, as described above in connection with block 506, includes not only the initial act of showing the search results on the screen, but may also include the act of updating the display to reflect new search results, or different search results based on a change in context or a change in the query associated with a badge. Additionally, it is noted that a user's modification of the search criteria is not the only reason that updated search results would be displayed. Search results could be updated based on any of the triggers 508 that were previously described, or based on any other triggers. Thus, while FIG. 5 shows search results being displayed, followed by a modification to the search criteria, followed by an updated to the search results, it may be the case that the process loops from 506 back to 506 without any intervening modification or customization of the search criteria, thereby allowing the search results to be updated recurrently.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is badge-based search software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Any claim that does not explicitly describe the media as "transitory" or "ephemeral" shall not be understood to describe information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

It is noted that the term "behavior" is used herein, and is explained by the foregoing description. However, if an occasion arises in which it is relevant to distinguish between saved searches and badges earned through behaviors, the term "non-search behavior" will be understood to indicate acts other than entering search queries, and the term "non-search behavior" will exclude acts that are, or that comprise, entering search queries. Moreover, the concept of a "badge earned through non-search behavior", or a concept designated by similar phrasing, will be understood to include badges earned by a user's performing some "non-search behavior," within the meaning of that term as explained above. However, a badge can be associated with a query, and it will be understood that "badge earned through non-search behavior" includes badges that are associated with queries, including those badges whose associated queries have been modified by the user as long as the badge was once earned by a user through non-search behavior.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable medium having executable instructions which, when executed by a device, causing the device to perform acts comprising:
   identifying a badge earned by a user based on a set of actions taken by the user, the badge indicating a durable property of the user related to the set of actions;
   automatically associating a query with the badge, the query comprising at least one key word related to the durable property;
   submitting, without user interaction, a search request using a modified version of the query, the modified query comprising the at least one key word and additional information from a context that exists at a time at which the search is requested;
   receiving, from a search provider, results based on said search without displaying the results;
   monitoring for an occurrence of a display triggering event, the display triggering event comprising at least one of: movement of the device, availability of a high quality result, location of friends of the user, and passage of time; and
   responsive to the occurrence of the triggering event, displaying the results on the device.

2. The computer-readable medium of claim 1, said device having a lock screen that prevents access to functions of said device until said lock screen is unlocked, said results being displayed with said badge on said lock screen.

3. The computer-readable medium of claim 1, said device having a lock screen that prevents access to functions of said device until said lock screen is unlocked, said device having a desktop beneath said lock screen that is viewable after said lock screen is unlocked, said results being displayed with said badge on said desktop.

4. The computer-readable medium of claim 1, said device being at a geographic location, said context comprising said geographic location.

5. The computer-readable medium of claim 1, wherein the display triggering event comprises movement of the device.

6. The computer-readable medium of claim 1, wherein the trigger event comprises high quality search results, the high quality search results determined by identifying that results received in response to the search request, have a first score that is greater than or equal to a minimum score, triggering of display of said results being based on quality said first score of said results.

7. The computer-readable medium of claim 1, the badge being assigned to users other than the user, the results being based on choices of the users.

8. The computer-readable medium of claim 1, said acts further comprising:
receiving, from said user, a request to customize said search request associated with said badge by modifying said query.

9. A method of showing search results based on a badge, the method comprising:
using a processor to perform acts comprising:
identifying a badge earned by a user based on a set of actions taken by the user, the badge indicating a durable property of the user related to the set of actions;
automatically associating a query with the badge, the query comprising at least one key word related to the durable property;
submitting, without user interaction, a search request using a modified version of the query, the modified query comprising the at least one key word and additional information from a context that exists at a time at which the search is requested;
receiving search results from a search provider, results based on the search request without displaying the results;
monitoring for an occurrence of a display triggering event, the display triggering event comprising at least one of: movement of the device, availability of a high quality result, location of friends of the user, and passage of time; and
responsive to the occurrence of the triggering event, displaying the search results.

10. The method of claim 9, wherein the method is executed by a device having a lock screen that prevents access to functions of said device until said lock screen is unlocked, said results being displayed with said badge on said lock screen.

11. The method of claim 9, wherein the method is executed by a device having a lock screen that prevents access to functions of said device until said lock screen is unlocked, said device having a desktop beneath said lock screen that is viewable after said lock screen is unlocked, said results being displayed with said badge on said desktop.

12. The method of claim 9, wherein the method is executed by a device being at a geographic location, said context comprising said geographic location.

13. The method of claim 9, wherein the triggering event comprises movement of the device.

14. The method of claim 9, wherein the triggering event comprises the search results having a first score that is greater than or equal to a minimum score.

15. The method of claim 9, the badge being assigned to users other than said user, the results being based on choices of said users.

16. The method of claim 9, said search request being customized by said user's modifying said query associated with said badge.

17. A device that provides search results based on a badge, the device comprising:
a memory;
a processor;
a display;
a badge that is stored in the memory and displayed on the display, the badge being earned by a user of the device based on a set of actions taken by the user, the badge indicating a durable property of the user related to the set of actions; and
a search component that is stored in the memory and that executes on the processor and that:
automatically associates a query with the badge, the query comprising at least one key word related to the durable property
without intervention from the user, makes a search request based on a modified version of the query, the modified version of the query comprising the at least one key word and additional information from on a context that exists at a time at which the request is made;
receives results in response to the search request without displaying the results;
monitors for an occurrence of a display triggering event, the display triggering event comprising at least one of: movement of the device, availability of a high quality result, location of friends of the user, and passage of time; and
responsive to the triggering event displays the results with the badge either on a lock screen of the device or on a screen behind the lock screen of the device.

18. The device of claim 17, said device being at a geographic location, said context comprising said geographic location.

19. The device of claim 17, the trigger event comprising determining that results received in response to the search request have a first score that is greater than or equal to a minimum score.

20. The device of claim 17, said badge being assigned to users other than the user, the results being based on choices of the users.

* * * * *